United States Patent [19]

Fauth et al.

[11] 4,391,959

[45] Jul. 5, 1983

[54] POLYMERIZATION OF ISOBUTYLENE

[75] Inventors: Karl-Heinz Fauth, Wattenheim; Heinrich Mohr, Frankenthal; Wolfgang Immel, Ludwigshafen, all of Fed. Rep. of Germany

[73] Assignee: BASF Aktiengesellschaft, Fed. Rep. of Germany

[21] Appl. No.: 341,875

[22] Filed: Jan. 22, 1982

Related U.S. Application Data

[63] Continuation-in-part of Ser. No. 238,594, Feb. 26, 1981, abandoned.

[30] Foreign Application Priority Data

Mar. 21, 1980 [DE] Fed. Rep. of Germany ....... 3010870

[51] Int. Cl.³ .............................................. C08F 4/14
[52] U.S. Cl. .................................. 526/70; 526/348.7; 526/918; 526/920
[58] Field of Search ............................................ 526/70

[56] References Cited

U.S. PATENT DOCUMENTS 2,176,194 10/1939 Bannon .................................. 526/70
2,906,793 9/1959 Rowe et al. ..................... 260/683.15
3,129,205 4/1964 Rowe et al. .......................... 260/85.3

OTHER PUBLICATIONS

Polymer Processes, Schildknecht, pp. 199–201, (1956).

Primary Examiner—Stanford M. Levin
Attorney, Agent, or Firm—Keil & Witherspoon

[57] ABSTRACT

A process for the preparation of polyisobutylene by polymerizing isobutylene in a polymerization zone which is at from 0° to −130° C., by means of from 0.01 to 1.0 percent by weight of boron trifluoride catalyst, in the presence of a primary or secondary alcohol as polymerization accelerator and in the presence of from 30 to 90% by weight of a low-boiling solvent which is inert under the reaction conditions, wherein the solvent vaporized during the polymerization is continuously drawn off, liquefied and recycled, in the liquid state, to the polymerization zone, and wherein the boron trifluoride catalyst used contains less than 0.3, in particular less than 0.01, percent by volume of silicon tetrafluoride and the solvent, which is preferably ethylene, is recycled not less than twice but not more than 36 times during the continuous polymerization.

4 Claims, 1 Drawing Figure

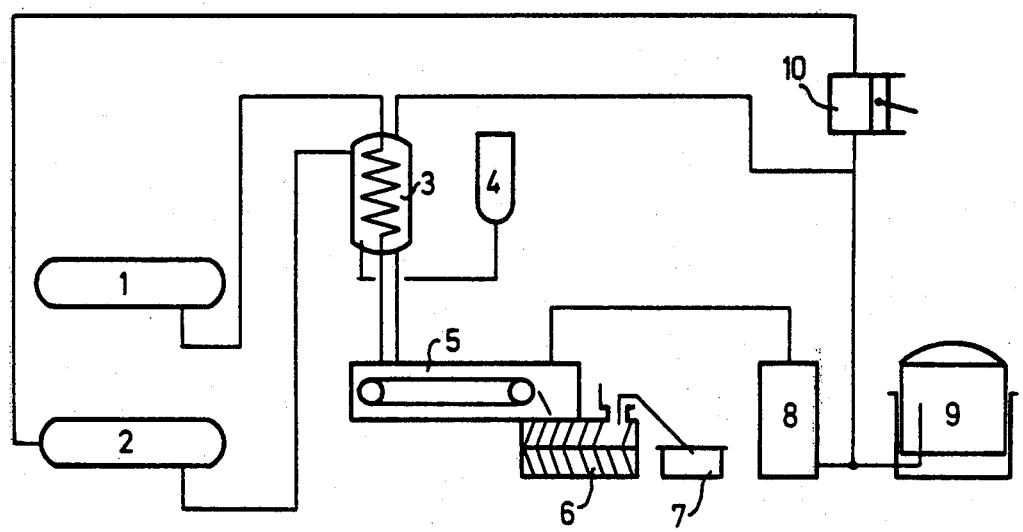

POLYMERIZATION OF ISOBUTYLENE

This application is a continuation-in-part of U.S. patent application Ser. No. 06/238,594, filed Feb. 26, 1981, now abandoned.

The present invention relates to a process for the preparation of polyisobutylene by polymerizing isobutylene in a polymerization zone which is at from 0° to −130° C., by means of from 0.01 to 1.0 percent by weight, based on isobutylene employed, of boron trifluoride catalyst, in the presence or absence of from 10 to 5,000 ppm, based on the weight of isobutylene employed, of molecular weight regulators and/or in the presence of from 10 to 5,000 ppm, based on the weight of isobutylene employed, of a primary or secondary alcohol as polymerization accelerator and in the presence of from 30 to 90 percent by weight, based on isobutylene employed, of a low-boiling solvent which is inert under the reaction conditions, the solvent vaporized during the polymerization being drawn off continuously, liquefied and recycled, in the liquid state, to the polymerization zone.

In such polymerization processes it is necessary to operate in the presence of a catalyst, with or without a molecular weight regulator, and in the presence of an accelerator, the latter being intended not only in increase the molecular weight of the polymer formed but also to accelerate the reaction and reduce the amount of catalyst. It is also industrially of interest to carry out the polymerization of isobutylene at fixed low temperatures, at which crosslinking reactions and side-reactions do not occur, and to remove the heat of polymerization of the isobutylene as it is generated.

It is known that these requirements can be met if the polymerization of isobutylene, which takes place at from 0° to −130° C., is catalyzed with a Friedel-Crafts compound, in the presence or absence of a molecular weight regulator, from 10 to 5,000 ppm, based on weight of isobutylene, of a polymerization accelerator is present to accelerate the reaction and increase the molecular weight, and the polymerization is carried out in the presence of a low-boiling inert solvent, which vaporizes under the reaction conditions, in order to remove the heat of reaction (cf. U.S. Pat. No. 3,129,205, U.S. Pat. No. 2,906,793 and German Pat. No. 1,099,171). In the conventional processes, the vaporized solvent is compressed in a compressor and recycled to the polymerization process.

The recycled solvent after a short time contains such a high concentration of foreign materials - which interfere with the action of the regulator and can increase the polymerization time and the catalyst consumption—that working up, in order to purify the solvent, becomes unavoidable (cf, German Laid-Open Application DOS No. 2,936,361).

Such purification can be effected by washing the solvent (cf. U.S. Pat. No. 3,129,205) or passing it over a purifying composition, conventionally alumina gel (cf. U.S. Pat. No. 2,906,793). In addition, an expensive distillation at low temperature or under pressure is in most cases required (cf. U.S. Pat. No. 3,129,205).

However, the known economical processes for purifying the solvent have the disadvantage that the acidic materials formed by side-reactions are only removed to a limited extent, if at all. For example, alumina gel has only a limited capacity for absorbing acidic materials, especially if traces of isobutylene pass from the polymerization zone into the solvent vapor circuit, polymerize on the alumina gel to form isobutylene oligomers, and cover the surface of the gel. Highly active alumina gels furthermore decompose if at the same time exposed to water or butanol formed in side-reactions, and the resulting fine powder causes troublesome blockages of fittings. Water, which on cooling the vaporized solvent to a low temperature passes through the filters in a micro-crystalline form, deposits in an undefined manner and even interferes with the polymerization of the isobutylene, proves extremely troublesome. Finally, the compressor oil which may be used is also the source of a number of interfering substances. These impurities result in increased catalyst consumption, and the catalyst residues must then be specially removed from the polymer. Furthermore, many impurities cause discoloration of the polymer. In addition, molecular compounds of the boron trifluoride catalyst with the impurities cause noticeable interference with the course of the polymerization. The activating action of these molecular compounds on the catalytic activity of the catalyst employed causes uneven progress of the polymerization (spashing). Accordingly, as is evident from the disadvantages listed, the processes for the cationic polymerization of isobutylene require improvement in many respects.

It is an object of the present invention to provide a continuous process for the polymerization of isobutylene which is free from the above disadvantages.

We have found that this object is achieved, according to the invention, by a process wherein a boron trifluoride catalyst which contains less than 0.3 percent by volume of silicon tetrafluoride is used, and the solvent is recycled not less than twice during the continuous polymerization.

Preferably, the boron trifluoride catalyst should contain less than 0.01 percent by volume of silicon tetrafluoride. In a particularly preferred embodiment of the process, the solvent is ethylene and is recycled up to 36 times.

Processes for the preparation of polyisobutylene by polymerizing isobutylene in a polymerization zone have been known for a considerable time and are described in detail in the monograph by H. Güterbock "Chemische Technologie der Kunststoffe in Einzeldarstellungen, Polyisobutylen", 1959, pages 77–105, Springer-Verlag, Berlin/Göttingen/Heidelberg. The polyisobutylenes obtained are viscous oils to resilient gums at room temperature, depending on the molecular weight, have a density of from 0.83 to 0.93 g/cm³ and possess the formula:

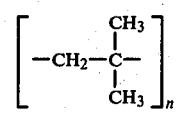

where n is from 2 to 80,000.

The polymerization of isobutylene is carried out by conventional methods at from 0° to −130° C., preferably from −50° C. to −110° C., under atmospheric pressure.

In order to be able to obtain a particular molecular weight of polyisobutylene when operating at a given temperature, molecular weight regulators may be used in the conventional amounts of from 10 to 5,000 ppm, based on weight of isobutylene employed. Examples of such molecular weight regulators are n-butene, diisobutylene, mercaptans, sulfides and polysulfides. In addition to lowering the molecular weight of the isobutylene polymers formed, the molecular weight regulators also substantially increase the reaction time and often also increase the catalyst consumption.

The isobutylene polymerization is carried out in the presence of from 10 to 5,000 ppm, based on weight of isobutylene employed, of a polymerization accelerator. These substances accelerate the reaction and reduce the amount of catalyst required. They furthermore result in the formation of high molecular weight polyisobutylenes, since chain-stopping factors become less important. The accelerators are primary or secondary alcohols of 1 to 10 carbon atoms, for example methanol, ethanol, n-propanol, iso-propanol, n-butanol, isobutanol, amyl alcohols, cyclohexanol and benzyl alcohol.

The polymerization of the isobutylene is carried out in the presence of from 30 to 90% by weight, based on isobutylene employed, of a low-boiling solvent which is inert under the reaction conditions. Preferred solvents, which are suitable because of their advantageous boiling points, are ethane, propane and especially ethylene, since evaporation of these under the reaction conditions provides a simple method of removing the heat of polymerization of the isobutylene. When using the above solvents which are also coolants, for example when using ethylene, the isobutylene is polymerized at the boiling point of the inert solvent. In the case of ethylene the polymerization temperature is thus $-104°$ C.

Using conventional methods, the solvent vaporized during the polymerization is drawn off continuously, liquefied and recycled, in the liquid state, to the polymerization zone.

Conventional additives, such as stabilizers, regulators, colorants and the like, can be incorporated into the isobutylene before or during the polymerization. However, they can also be admixed to the polyisobutylenes after the polymerization. The stabilizers are in general employed in amounts of from 0.01 to 2.0% by weight, preferably from 0.05 to 0.25% by weight, based on weight of polyisobutylene.

Suitable stabilizers are all the compounds conventionally used for stabilizing polyisobutylene. Specific examples are phenolic antioxidants, e.g. 2,6-di-tert.-butyl-p-cresol, tertiary amyl-phenyl sulfide and tertiary amyl-phenyl disulfide. Further suitable compounds, which contain amine, sulfide or aromatic hydroxyl groups, are di-(2-hydroxy-5-butyl-phenyl) sulfide and disulfide, phenyl-$\beta$-naphthylamine, polyvinyl ethyl sulfide and polyvinyl butyl sulfide.

Boron trifluoride is employed as a polymerization catalyst. It is prepared industrially by heating boron trioxide, calcium fluoride, sulfuric acid and oleum in a stirred cast iron kettle (cf. British Pat. No. 324,016). Further methods of preparation are described in U.S. Pat. Nos. 2,148,514, 2,196,907, 2,135,460, 2,163,232 and 2,416,133. A feature common to all the processes is that they start from materials containing silicon dioxide. The preparation of boron trifluoride by the various processes (cf. A. V. Topciev: "Borfluorid und seine Verbindungen als Katalysatoren in der Chemie", VEB-Verlag Berlin, 1962, pages 3-8) is accompanied by the formation of a number of by-products, such as steam, hydrogen, fluoride, sulfur trioxide, sulfur dioxide and silicon tetrafluoride, which constitute foreign constituents in the product. If this boron trifluoride is used, under conventional laboratory conditions, as a catalyst for the batchwise polymerization of isobutylenes, no interfering side-reactions occur in the majority of cases. However, in the continuous industrial process, in which the solvent, diluent and coolant vaporized during the polymerization is continuously drawn off, liquefied and recycled, in the liquid state, to the polymerization zone, i.e. in which it is circulated, an adverse effect on the catalytic activity of the boron trifluoride is observed. Substances which act as regulators and either accelerate or inhibit the polymerization of isobutylene are formed. This results in uneven polymerization characteristics and splashing, a delayed boiling caused by the vigorous heat of reaction, which must be removed by internal cooling, using ethylene as the coolant.

In the process according to the invention, a boron trifluoride which contains less than 0.3 percent by volume of silicon tetrafluoride is used, and the solvent is recycled not less than twice during the continuous polymerization. In particular, the boron trifluoride used should contain less than 0.01 percent by volume of silicon tetrafluoride. The solvent, which preferably consists of ethylene, can under these circumstances by recycled up to 36 times.

To prepare the boron trifluoride required according to the invention, various methods of purification are available.

To remove the silicon tetrafluoride formed, the crude gas is passed through a column filled with sodium fluoride and fused boron trioxide (cf. H. Bowlus, J. Amer. Chem. Soc. 53 (1931), 3,835) or is liquefied by cooling in liquid air and then fractionated under reduced pressure. Boron trifluoride and silicon tetrafluoride can be separated by a single distillation if a good fractionating column is used (cf. I. R. Johnson, J. Amer. Chem. Soc. 60 (1938), 115, and H. Meerwein, J. prakt. Chem. 147 (1936), 226). Purified boron trifluoride is commercially available.

The process according to the invention makes it possible to prepare polyisobutylene not only batchwise but also continuously over long periods, without problems. The polyisobutylenes obtained by the process according to the invention have an intrinsic viscosity $[\eta]$ of 0.9–12 dl/g (determined according to ASTM D 1601 and DIN 51,562), possess a narrow molecular weight distribution, with only a small standard deviation, and are distinguished by only very slight discoloration and a low ash content. It is an advantage of the process according to the invention that problems during polymerization, such as increased formation of water and alcohol through side-reactions, the occurrence of reactions with any drying agents employed, such as reaction with calcium chloride accompanied by liberation of hydrochloric acid, increased oligomer formation, blockages of measuring lines by catalyst residues and low molecular weight polyisobutylenes, and crust formation on appliances and heat exchangers, are avoided.

A particular advantage of using carefully purified boron trifluoride which contains less than 0.3 percent by volume of silicon tetrafluoride is that the ethylene employed as the coolant, solvent and diluent can be repeatedly reused, without problems, for the boron trifluoride-initiated polymerization of isobutylene.

The Examples which follow illustrate the novel process. The molecular weights quoted were determined by the Staudinger method.

To illustrate the prior art, a technical-grade boron trifluoride, having a purity of 95% by volume, was used. It contained the following impurities: p1 nitrogen: 1.30% by volume
hydrogen: 0.02% by volume
oxygen: 0.6% by volume
argon: 0.02% by volume
carbon monoxide: 0.01% by volume
silicon tetrafluoride: 2% by volume
sulfur dioxide: 1% by volume For the process according to the invention, a commercially available carefully purified boron trifluoride, having a purity of 99.7% by volume, was employed. An average analysis showed the following impurities:
sulfur dioxide: 0.001% by volume
sulfate: 0.001% by volume
silicon tetrafluoride: 0.01% by volume
air: 0.25% by volume Continuous polymerization of isobutylene (cf. drawing)

The essential part of the process described in H. Güterbock, Springer Verlag, Berlin-Göttingen-Heidelberg, 1959, pp. 98-99, is an endless, smooth steel belt 50 cm wide and 16-18 m long, which travels over two rollers arranged in such a manner that the belt is inclined at an angle of 5° to the horizontal and forms a trough as a result of suitable guide means.

A 1:1 mixture of pure, dried, liquid ethylene and isobutylene flows on to one end of the steel belt through a tube. From a second tube a solution of boron trifluoride (in the same amount as ethylene) flows on to the belt.

The figures in the drawing have the following meanings:
(1) Isobutylene vessel
(2) Ethylene vessel
(3) Deep cooler
(4) Boron trifluoride vessel
(5) Polymerization zone
(6) Kneader
(7) Finished product
(8) Purification zone
(9) Gasholder
(10) Compression zone

EXAMPLE 1

Liquid isobutylene from (1), containing 1,000 ppm by volume of isobutanol, and deep-cooled in (3), and the same amount of pure liquid ethylene not yet used for polymerization from (2) flowed together into (5). At the same time, the same amount of pure ethylene, which had not yet passed through the polymerization zone and which contained 0.03% of technical-grade boron trifluoride (purity: 95 vol %), flowed into (5) from (4).

Polymerization took place at −104° C. and was complete after a few seconds. The heat of reaction was removed by evaporating the liquid ethylene. The ethylene was purified (8), recycled via (10) to (2), and reused. This procedure was repeated 30 times, the following figures being obtained on the 31st run:
molecular weight of polyisobutylene: 183,000
reaction time: 1 second
splash tendency: strong

EXAMPLE 2

The procedure described in Example 1 was followed with the sole exception that boron trifluoride was used (purity: 99.7% by volume) from which $SiF_4$ had been removed. The following polymerization data were obtained:
molecular weight: 280,000
reaction time: 9 seconds
splash tendency: smooth polymerization without splashing

EXAMPLE 3

The procedure described in Example 1 was followed, with the exception that the polymerization data from the fourth run were recorded:
molecular weight: 247,000
reaction time: 4 seconds
splash tendency: average

EXAMPLE 4

The procedure described in Example 3 was followed, with the sole exception that purified boron trifluoride was used (purity: 99.7% by volume).
Molecular weight: 280,000
reaction time: 9 seconds
splash tendency: smooth polymerization without splashing

We claim:

1. A process for the preparation of polyisobutylene by polymerizing isobutylene in a polymerization zone which is at from 0° to −130° C. by means of from 0.01 to 1.0 percent by weight, based on isobutylene employed, of boron trifluoride catalyst, in the presence or absence of from 10 to 5,000 ppm, based on the weight of isobutylene employed, of molecular weight regulators and/or in the presence of from 10 to 5,000 ppm, based on the weight of isobutylene employed, of a primary or secondary alcohol as polymerization accelerator, and in the presence of from 30 to 90 percent by weight, based on isobutylene employed, of a low-boiling solvent which is inert under the reaction conditions, the solvent vaporized during the polymerization being drawn off continuously, liquefied and recycled, in the liquid state, to the polymerization zone, wherein a boron trifluoride catalyst which contains less than 0.3 percent by volume of silicon tetrafluoride is used and the solvent is recycled not less than twice during the continuous polymerization.

2. A process as set forth in claim 1, wherein the boron trifluoride catalyst contains less than 0.01 percent by volume of silicon tetrafluoride.

3. A process as set forth in claim 1, wherein the solvent is recycled up to 36 times.

4. A process as set forth in claim 1, wherein the recycled solvent is ethylene.

* * * * *